*US008732378B2*

US008732378B2

(12) United States Patent
Nakazono et al.

(10) Patent No.: US 8,732,378 B2
(45) Date of Patent: *May 20, 2014

(54) BUS BANDWIDTH MONITORING DEVICE AND BUS BANDWIDTH MONITORING METHOD

(75) Inventors: Keisuke Nakazono, Tokyo (JP);
Tomonori Yonemoto, Yokohama (JP);
Akira Ueno, Tokyo (JP)

(73) Assignee: Olympus Corporation, Tokyo (JP)

( * ) Notice: Subject to any disclaimer, the term of this patent is extended or adjusted under 35 U.S.C. 154(b) by 210 days.

This patent is subject to a terminal disclaimer.

(21) Appl. No.: 13/207,877

(22) Filed: Aug. 11, 2011

(65) Prior Publication Data
US 2012/0042110 A1  Feb. 16, 2012

(30) Foreign Application Priority Data

Aug. 16, 2010 (JP) ................................. 2010-181610

(51) Int. Cl.
*G06F 13/26* (2006.01)

(52) U.S. Cl.
USPC .......................................... 710/310; 710/244

(58) Field of Classification Search
USPC ................................. 710/244, 310
See application file for complete search history.

(56) References Cited

U.S. PATENT DOCUMENTS 6,006,303 A * 12/1999 Barnaby et al. ............... 710/244
2002/0131496 A1 * 9/2002 Vasudevan et al. ...... 375/240.11

| 2006/0059291 | A1* | 3/2006 | Rosing | 710/305 |
| 2007/0220403 | A1* | 9/2007 | Allen | 714/774 |
| 2008/0025347 | A1* | 1/2008 | Mantegna et al. | 370/516 |
| 2008/0162951 | A1* | 7/2008 | Kenkare et al. | 713/300 |

FOREIGN PATENT DOCUMENTS

| JP | 01-250161 A | 10/1989 |
| JP | 02-018656 A | 1/1990 |
| JP | 05-061818 A | 3/1993 |
| JP | 05-307444 A | 11/1993 |
| JP | 08-314851 A | 11/1996 |
| JP | 09-204394 A | 8/1997 |
| JP | 2001-101128 A | 4/2001 |
| JP | 2003-323397 A | 11/2003 |
| JP | 2004-178056 A | 6/2004 |
| JP | 2007-114918 A | 5/2007 |

OTHER PUBLICATIONS

Japanese Office Action dated Feb. 12, 2014, issued in corresponding Japanese application No. 2010-181610, w/ English translation (6 pages).

Japanese Office Action dated Feb. 18, 2014, issued in related Japanese application No. 2010-181611, w/ English translation (8 pages).

* cited by examiner

*Primary Examiner* — Nimesh G Patel
(74) *Attorney, Agent, or Firm* — Westerman, Hattori, Daniels & Adrian, LLP (57) ABSTRACT

A bus bandwidth monitoring device may include a buffer unit that is connected to a common bus, the buffer unit storing data that has been input via the common bus, a processing unit that performs predetermined processing based on the data stored in the buffer unit, and a detection unit that detects a bandwidth of data transmitted through the common bus based on a state of data transaction between the buffer unit and the processing unit.

8 Claims, 10 Drawing Sheets

BUS BANDWIDTH MONITORING DEVICE AND BUS BANDWIDTH MONITORING METHOD

BACKGROUND OF THE INVENTION

1. Field of the Invention

The present invention relates to a bus bandwidth monitoring device and a bus bandwidth monitoring method.

Priority is claimed on Japanese Patent Application No. 2010-181610, filed Aug. 16, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In many of the system LSIs, for example, system LSIs mounted in image processing devices such as a camera for static images, a camera for dynamic images, an endoscope for medical use, and an endoscope for industrial use, a plurality of built-in processing blocks share a single DRAM (Dynamic Random Access Memory) connected thereto. In such system LSIs, the built-in processing blocks are connected to a data bus inside the system LSI. Each processing block accesses the DRAM through DMA (Direct Memory Access). At this time, a bus controller controls accesses to the DRAM while properly arbitrating requests to access the DRAM from the processing blocks. In the arbitration of the access requests by the bus controller, it is required that the access requests from the processing blocks be arbitrated so as to satisfy the performance as a system.

Methods of arbitrating access requests include the static priority method and the round-robin method. The static priority method is a method in which a static level of priority is preset for every processing block and the access request from the processing block with a higher level of priority is preferentially accepted. In the round-robin method, the processing block whose access request has been accepted is set lower in its level of priority while the processing block whose access request has not been accepted is set higher in its level of priority, thus making the access requests from the processing blocks equally acceptable.

However, the methods of arbitrating access requests such as the static priority method and the round-robin method is not capable of finely set the priority levels of the processing blocks according to, for example, operation modes of the image processing apparatus. For example, Japanese Unexamined Patent Application, First Publication No. H5-61818 discloses a technique of counting the number of times the access request is accepted in every processing block, and then changing the priority levels of the processing blocks based on the count.

With the combination of the static priority method and the round-robin method, for example, Japanese Unexamined Patent Application, First Publication No. 2007-114918 and Japanese Unexamined Patent Application, First Publication No. 2004-178056 discloses a method of dynamically arbitraging access requests in which the priority levels of the processing block are dynamically modified. In the technique disclosed in Japanese Unexamined Patent Application, First Publication No. 2007-114918, the priority levels of the processing blocks are dynamically changed according to the frequency of the access requests sent from the processing blocks such as by making higher the priority levels of the processing blocks whose access request has not been accepted for a predetermined period of time or longer. In the technique disclosed in Japanese Unexamined Patent Application, First Publication No. 2004-178056, priority levels of a plurality of processing blocks are incremented by a predetermined amount when the access requests from the processing blocks conflict one another, to thereby modify the priority levels dynamically.

In a method of arbitrating access requests such as disclosed in Japanese Unexamined Patent Application, First Publication No. H5-61818, the number of access requests of each processing block within a predetermined time for measurement range. Thereby, an average value of the bus bandwidths, which represents data amounts on the data bus when DRAM is accessed by each processing block, (an average bandwidth) is measured. Based on the information on the measured average bandwidth, the priority level of each processing block is changed.

However, in the actual operation of each processing block, there are cases where a variance in frequency of access requests results in a longer processing time or an excessive occupation of the data bus even if the average bandwidth of the data bus is the same.

Figure 7:
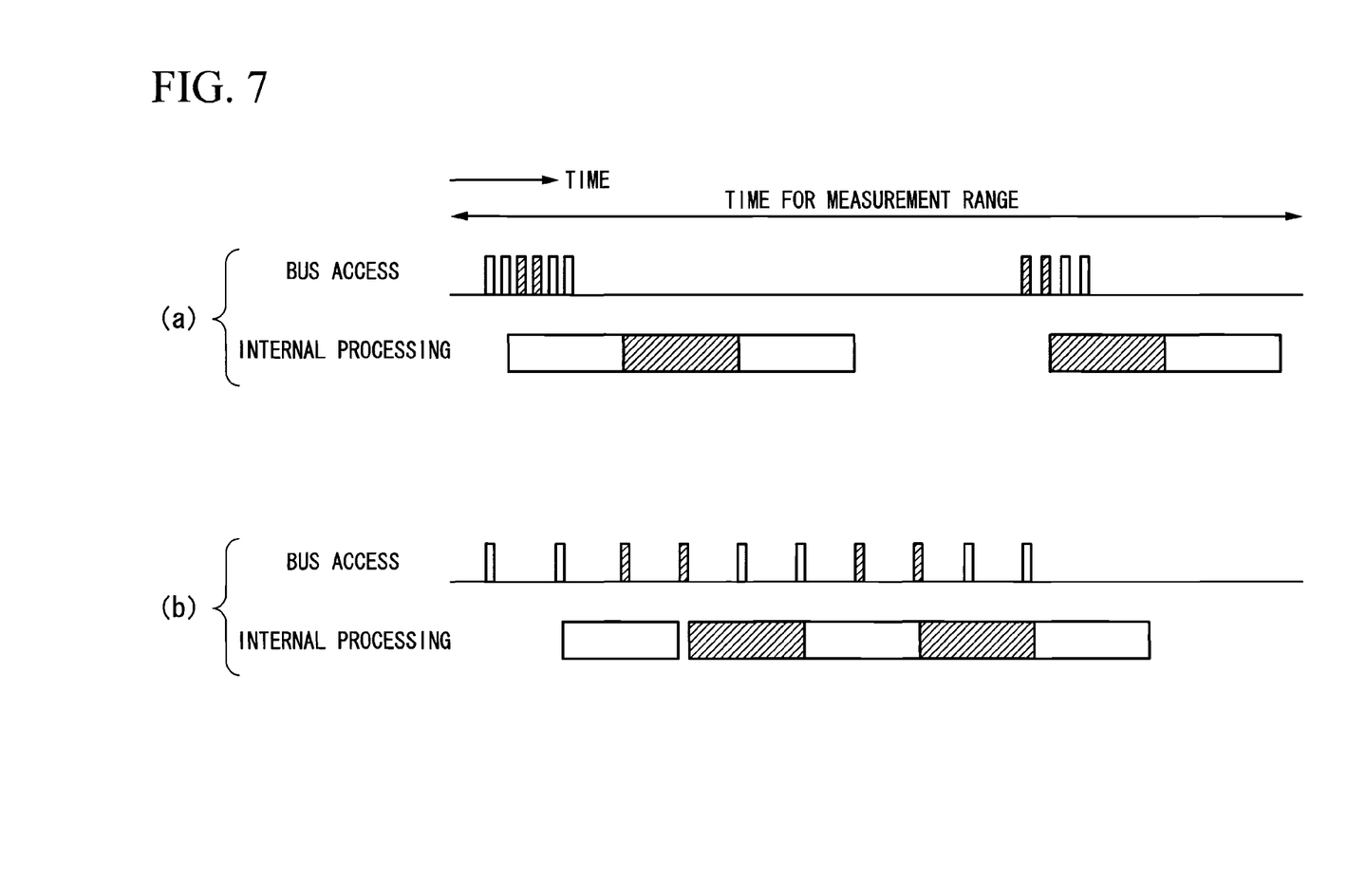
FIG. 7 is a diagram schematically showing an exemplary relationship between accesses and processing time of a single processing block.

A relationship among the frequency of an access request, the processing time, and the occupation of a data bus will be described. FIG. 7 schematically shows an exemplary relationship between accesses and processing time of a single processing block. FIG. 7 shows the case of a processing block in which an internal processing is performed for every set of two bus accesses. FIG. 7(a) shows an example in which the grouped bus accesses causes an occupation of access to a DRAM for a certain length of time. FIG. 7(b) shows an example in which the bus accesses to the DRAM is not grouped but dispersed. The measurement result of the average bandwidth of the data bus is the same for the bus accesses shown in FIG. 7(a) and the bus accesses shown in FIG. 7(b). In the case of FIG. 7(a), it is possible to occupy the accesses to the DRAM. However, because data for the subsequent processing is not prepared after completion of the internal processing, the time in which the internal processing is suspended is long, resulting in a long processing time.

Figure 8:
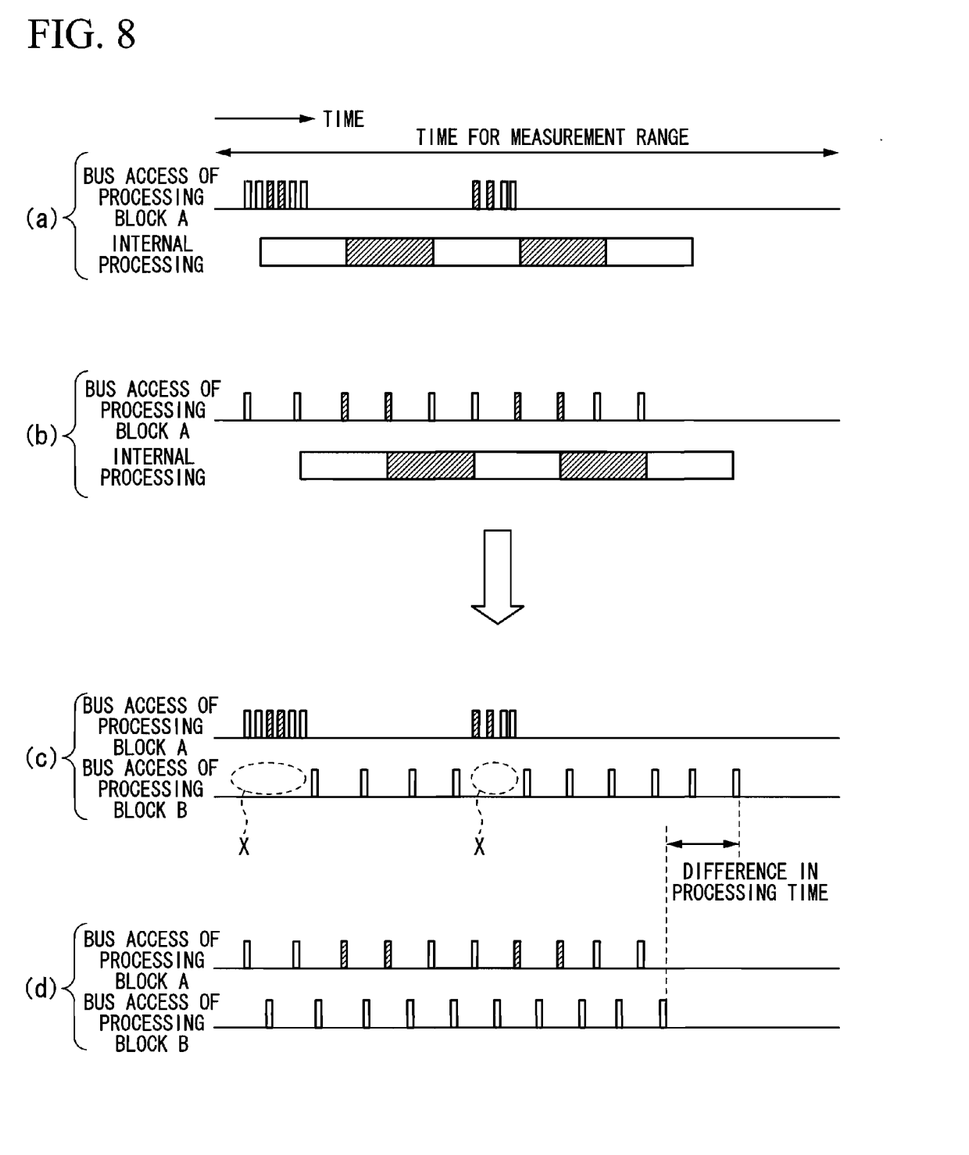
FIG. 8 is a diagram schematically showing an exemplary relationship of accesses of a data bus in two processing blocks.

FIG. 8 schematically shows an exemplary relationship of accesses of a data bus in two processing blocks. Similarly to FIG. 7, FIG. 8 shows the case of a processing block in which an internal processing is performed for every set of two bus accesses. FIG. 8(a) shows an exemplary relationship between bus accesses and a processing time in the case where bus accesses of a single processing block are made in a grouped manner, similarly to FIG. 7(a). FIG. 8(b) shows an exemplary relationship between bus accesses and a processing time in the case where bus accesses of a single processing block are made in a dispersed manner, similarly to FIG. 7(b). Similarly to FIG. 7, the measurement result of the average bandwidth of the data bus is the same for FIGS. 8(a) and 8(b). In addition, unlike FIGS. 7(a) and 7(b), the processing time of the processing block is the same for FIGS. 8(a) and 8(b).

FIGS. 8(c) and 8(d) show cases where two processing blocks are in simultaneous operation. FIG. 8(e) shows a case where a processing block A, which makes bus accesses in a grouped manner similarly to FIG. 8(a), and a processing block B, which makes bus accesses in a dispersed manner similarly to FIG. 8(b), are in simultaneous operation. FIG. 8(d) shows a case where a processing block A and a processing block B, which make bus accesses in a dispersed manner similarly to FIG. 8(b), are in simultaneous operation.

As is seen from FIGS. 8(c) and 8(d), simultaneous operation of two processing blocks produces a difference in the entire processing time even if the average bandwidth and the processing time are the same in one of the processing blocks, that is, the processing block A. Namely, in FIG. 8(d), two processing blocks are capable of accessing DRAM without interfering each other. On the other hand, in FIG. 8(c), conflicts in the data bus in periods X produce periods of time that prevents the processing block B from accessing the DRAM, resulting in at long, entire processing time. The conflicts in the data bus in the periods X were produced by the occupation of the access to the DRAM by the processing block A when the processing block B is to access the DRAM.

Thus, only by the average bandwidth when the processing blocks use the data bus, it is not possible to judge the performance as a system. Therefore, it is difficult to properly arbitrate the access requests from the processing blocks.

In the techniques of dynamically modifying the priority levels such as disclosed in Japanese Unexamined Patent Application, First Publication No. 2007-114918 and Japanese Unexamined Patent Application, First Publication No. 2004-178056, it is often required to set the priority levels of the processing blocks according to the average bandwidth of the data bus in the access requests sent from the processing blocks, the capacities of the buffers provided in the processing blocks, the importance levels of the processing blocks in each operation mode of the system, and the like, so as not to cause a failure as a system.

However, there is no way to obtain information functioning as a guideline when the priority levels of the processing blocks are set. For example, if there is a failure as a system, there is no way to identify factors such as which processing block has caused the system failure or the degree of modification of the priority settings to allow the system to operate without failure. Therefore, conventionally, in setting the priority levels of the processing blocks, the priority levels are provisionally set and the system is actually operated. With the repetition of this procedure, the settings that do not cause a failure as a system are found. This results in a low efficiency in system development.

SUMMARY

The present invention provides a bus bandwidth monitoring device and a bus bandwidth monitoring method that are capable of obtaining information useful for setting the priority levels of processing blocks.

A bus bandwidth monitoring device may include a buffer unit that is connected to a common bus, the buffer unit storing data that has been input through the common bus, a processing unit that performs predetermined processing based on the data stored in the buffer unit, and a detection unit that detects a bandwidth of the data transmitted through the common bus based on a state of data transaction between the buffer unit and the processing unit.

A bus bandwidth monitoring device may include a processing unit that performs predetermined processing on input data and outputs the processed data, a buffer unit that is connected to a common bus, the buffer unit storing the data that has been output by the processing unit and outputting the stored data to the common bus, and a detection unit that detects a bandwidth of the data transmitted through the common bus based on a state of data transaction between the processing unit and the buffer unit.

The detection unit may include a counter unit that measures a period of time during which although an output of the data stored in the buffer unit is requested by the processing unit, the buffer unit is in a state incapable of outputting the data in accordance with the output request of the data. Information on the period of time measured by the counter unit may be output as information on the bandwidth of the data on the common bus.

The detection unit may include a storage unit that stores plural pieces of information on the periods of time measured by the counter unit. Plural pieces of information on the period of time measured by the counter unit for a plurality of times may be output as pieces of information on the bandwidth of the data on the common bus.

The detection unit may output information on a maximum period of time out of the periods of time measured by the counter unit as information on bandwidth of the data on the common bus.

A bus bandwidth monitoring method may include storing data that is input via a common bus, performing predetermined processing based on the stored data, and detecting a bandwidth of data transmitted through the common bus based on a state of data transaction on the common bus.

A bus bandwidth monitoring method may include performing predetermined processing on input data and outputting the processed data, receiving and storing the output data via a common bus, outputting the stored data to the common bus, and detecting a bandwidth of data transmitted through the common bus based on a state of data transaction on the common bus.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative embodiments. Those skilled in the art will recognize that many alternative embodiments can be accomplished using the teaching of the present invention and that the present invention is not limited to the embodiments illustrated for explanatory purpose.

Figure 1:
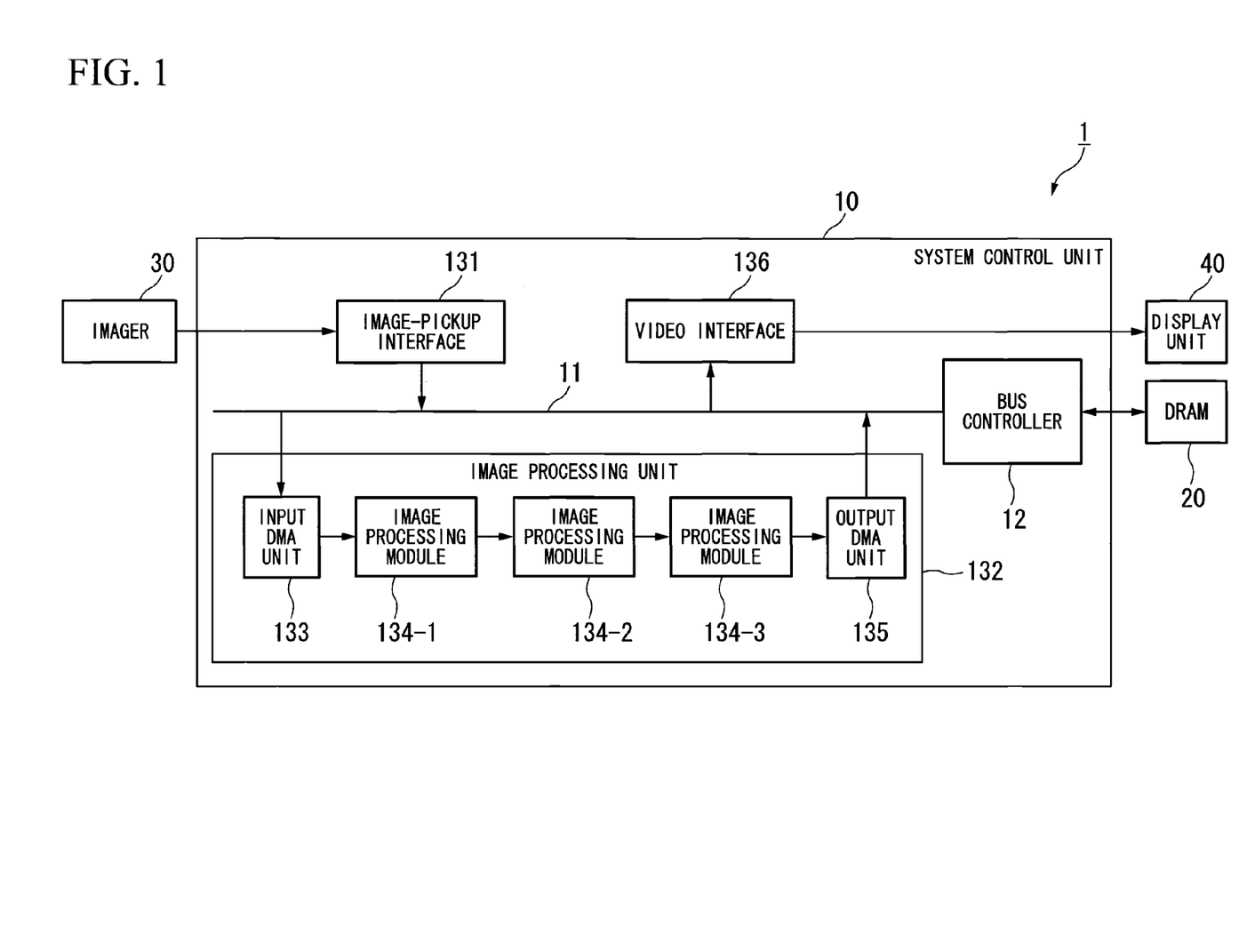
FIG. 1 is a block diagram showing a schematic configuration of an image processing device in accordance with a first preferred embodiment of the present invention.

FIG. 1 is a block diagram showing a schematic configuration of an image processing device in accordance with the first preferred embodiment of the present invention. The image processing device 1 shown in FIG. 1 includes: a system control unit 10; a DRAM 20; an imager 30; and a display unit 40.

The imager 30 includes a solid-state image sensing device that photoelectrically converts an optical image of a subject imaged by a lens (not shown in the figure). The imager 30 outputs image signals in accordance with the light of the subject (hereinafter, referred to as "input image data") to the system control unit 10.

The display unit 40 includes a display device such as an LCD (Liquid Crystal Display). The display unit 40 displays an image based on image signals for display that are output from the system control unit 10 (hereinafter, referred to as "output image data").

Access to the DRAM 20 is controlled by the system control unit 10. The DRAM 20 stores a variety of data during processing by the system control unit 10.

The system control unit 10 is a system LSI that performs a variety of processing operations in the image processing device 1. The system control unit 10 includes: a bus controller 12; an image-pickup interface 131; an image processing unit 132; and a video interface 136. The constituent elements in the system control unit 10 are connected to one another via a data bus 11, and uses the DMA access to read data from the DRAM 20 and write data to the DRAM 20.

At this time, the bus controller 12 arbitrates DMA access requests to the DRAM 20 that are sent from the constituent elements connected to the data bus 11, and actually accesses the DRAM 20.

When a DMA access request is input from any of the constituent elements in the system control unit 10, the bus controller 12 checks whether there is another constituent element that is currently in use of the data bus 11 to make a DMA access to the DRAM 20. If there is another constituent element that is currently in use of the data bus 11, the bus controller 12 does not accept the DMA access request. If there is no other constituent element that is currently in use of the data bus 11, the bus controller 12 accepts the DMA access request that has been input, and controls the DRAM 20 in accordance with the DMA access by the constituent element that has output the DMA access request.

Furthermore, if DMA access requests are input from a plurality of constituent elements in the system control unit 10, the bus controller 12 checks the priority levels of the constituent elements, accepts the DMA access request from the constituent element with highest priority level out of all the constituent elements making the DMA access requests, and does not accept the DMA access requests from the other constituent elements. In this manner, the bus controller 12 arbitrates the DMA access requests based on the priority levels of the constituent elements in the system control unit 10.

The image-pickup interface 131 is a processing block for writing (storing) the input image data, which has been input from the imager 30, to the DRAM 20. The image-pickup interface 131 temporarily stores the input image data that has been input from the imager 30. In writing the input image data to the DRAM 20, the image-pickup interface 131 outputs a DMA access request to access the DRAM 20 to the bus controller 12. After the DMA access request is accepted by the bus controller 12, the image-pickup interface 131 outputs the temporarily-stored input image data to the DRAM 20 via the bus controller 12.

The image processing unit 132 is a processing block for reading the input image data stored in the DRAM 20, subjecting the input image data to a variety of image processing operations, and writing (storing) output image data having been processed for display to the DRAM 20. The image processing unit 132 includes: an input DMA unit 133; image processing modules (an image processing module 134-1 to an image processing module 134-3 and an output DMA unit 135. The image processing unit 132 has its constituent elements connected in series, and subjects a plurality of image processing operations to pipeline processing, to thereby actualize a plurality of image processing operations in a narrow bus bandwidth.

The input DMA unit 133 is a processing block for reading the input image data stored in the DRAM 20 and outputting the input image data that has been read to the image processing module 134-1. When reading the input image data from the DRAM 20, the input DMA unit 133 outputs a DMA access request to access the DRAM 20 to the bus controller 12. After the DMA access request is accepted by the bus controller 12, the input DMA unit 133 reads the input image data from the DRAM 20 via the bus controller 12, and temporarily stores the input image data that has been read. The input DMA unit 133 then outputs the temporarily-stored input image data to the image processing module 134-1.

Each of the image processing module 134-1 to the image processing module 134-3 performs a variety of digital image processing operations on the image signals that have been input, and output them to the processing block at its subsequent stage. Examples of the image processing by the image processing module 134-1 to the image processing module 134-3 include image processing for recording which records image signals and image processing for display which displays an image of a subject on the display unit 40. In the following description, it is assumed that the input image data that has been input from the input DMA unit 132 is converted (image-processed) to image signals for display by use of the image processing module 134-1 to the image processing module 134-3, and is then output as output image data from the image processing module 134-3 to the output DMA unit 135.

The output DMA unit 135 is a processing block for writing (storing) the output image data, which has been input from the image processing module 134-3, to the DRAM 20. The output DMA unit 135 temporarily stores the output image data that has been input from the image processing module 134-3. When writing the output image data to the DRAM 20, the output DMA unit 135 outputs a DMA access request to access the DRAM 20 to the bus controller 12. After the DMA access request is accepted by the bus controller 12, the output DMA unit 135 outputs the temporarily-stored output image data to the DRAM 20 via the bus controller 12.

The video interface 136 is a processing block for reading the output image data stored in the DRAM 20 and outputting the output image data that has been read to the display unit 40. When reading the output image data from the DRAM 20, the video interface 136 outputs a DMA access request to access the DRAM 20 to the bus controller 12. After the DMA access request is accepted by the bus controller 12, the video interface 136 reads the output image data from the DRAM 20 via the bus controller 12, and temporarily stores the output image data that has been read. The video interface 136 then outputs the temporarily-stored output image data to the display unit 40.

In this manner, each processing block in the system control unit 10 temporarily stores data in a temporary storage region (buffer) provided therein. After the DMA access request is accepted by the bus controller 12, each processing block writes/reads the temporarily-stored data to/from the DRAM 20 via the data bus 11 and the bus controller 12.

The processing blocks in the system control unit 10 are divided into: processing blocks that read data from the DRAM 20 through the DMA access, such as the video interface 136 and the input DMA unit 133 (hereinafter, each referred to as a "read proxy"); and processing blocks that write data to the DRAM 20 through the DMA access, such as the image-pickup interface 131 and the output DMA unit 135 (hereinafter, each referred to as a write proxy).

Figure 2A:
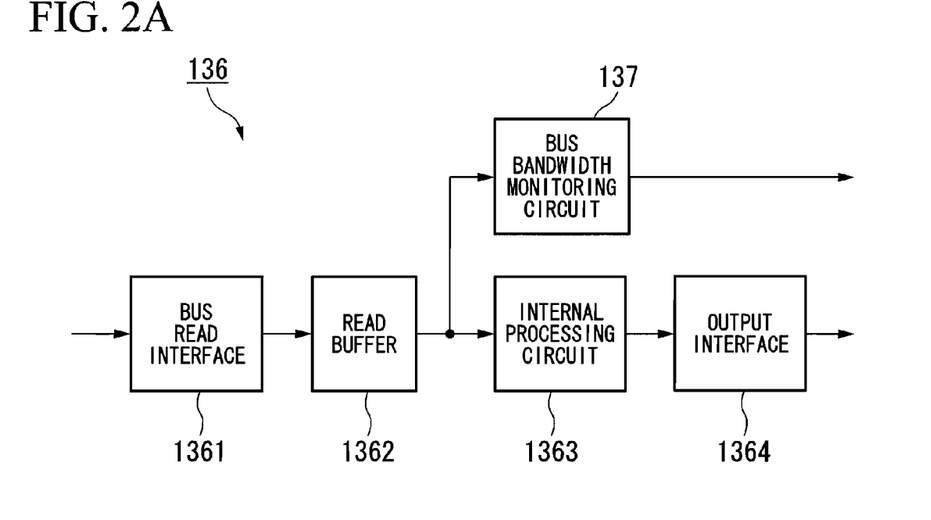
FIG. 2A and FIG. 2B are block diagrams each showing a schematic configuration of a processing block in accordance with the first preferred embodiment of the present invention.
Figure 2B:
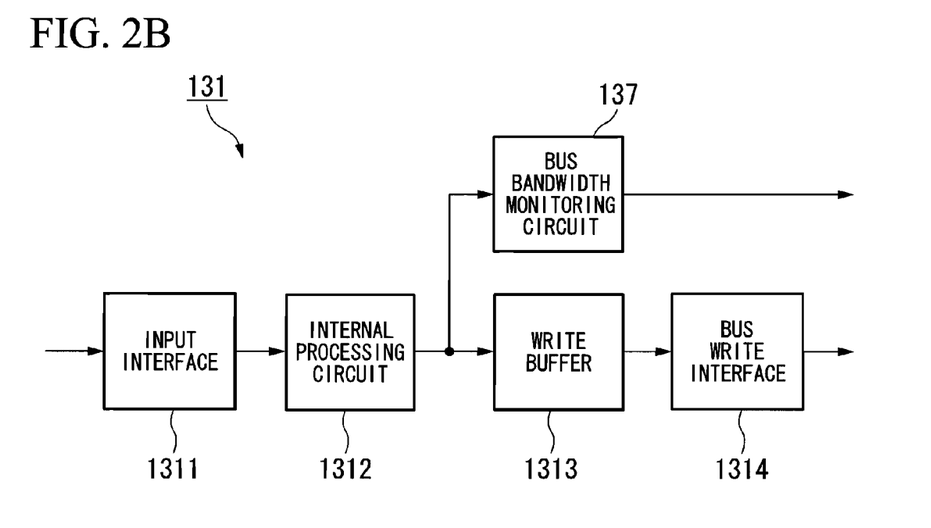

Next, the processing blocks in the system control unit 10 will be described. FIG. 2A and FIG. 2B are block diagrams each showing a schematic configuration of a processing block in accordance with the first preferred embodiment of the present invention. FIG. 2A shows a schematic configuration of a read proxy. FIG. 2B shows a schematic configuration of a write proxy. In the following description, the video interface 136 will be described as a read proxy, and the image-pickup interface 131 will be described as a write proxy. Furthermore, the video interface 136 may be referred to as the read proxy 136, and the image-pickup interface 131 may be referred to as the write proxy 131.

As shown in FIG. 2A, the read proxy 136 includes: a bus read interlace 1361; a read buffer 1362; an internal processing circuit 1363; an output interface 1364; and a bus bandwidth monitoring circuit 137.

The bus read interface 1361 is an interface circuit that takes the data, which is read from the DRAM 20 to the data bus 11 through the DMA access, into the read proxy 136.

The read buffer 1362 is a buffer circuit that temporarily stores the data in the data bus 11 taken in by the bus read interface 1361.

The internal processing circuit 1363 is a processing circuit that processes, as the read proxy 136, the data temporarily-stored in the read buffer 1362.

The output interface 1364 is an interface circuit that outputs the data processed by the internal processing circuit 1363 to another block connected to the read proxy 136 (for example, to the display unit 40 if the read proxy 136 is the video interface 136).

The bus bandwidth monitoring circuit 137 is a monitoring circuit that obtains information functioning as a guideline necessary for setting the priority levels of the read proxy 136 (hereinafter, referred to as "priority guideline information").

As shown in FIG. 2B, the write proxy 131 includes: an input interface 1311; an internal processing circuit 1312; a write buffer 1313; a bus write interface 1314; and a bus bandwidth monitoring circuit 137.

The input interface 1311 is an interface circuit that inputs the data, which has been input from the other block connected to the write proxy 131 (for example, to the imager 30 if the write proxy 131 is the image-pickup interface 131), to the write proxy 131.

The internal processing circuit 1312 is a processing circuit that processes, as the write proxy 131, the data which has been input via the input interface 1311.

The write buffer 1313 is a buffer circuit that temporarily stores the data processed by the internal processing circuit 1312 for outputting to the DRAM 20 through the DMA access.

The bus write interface 1314 is an interface circuit that outputs the data temporarily stored in the write buffer 1313 to the data bus 11 and writes the data to the DRAM 20.

The bus bandwidth monitoring circuit 137 is a monitoring circuit that obtains the priority guideline information on the write proxy 131.

Figure 3A:
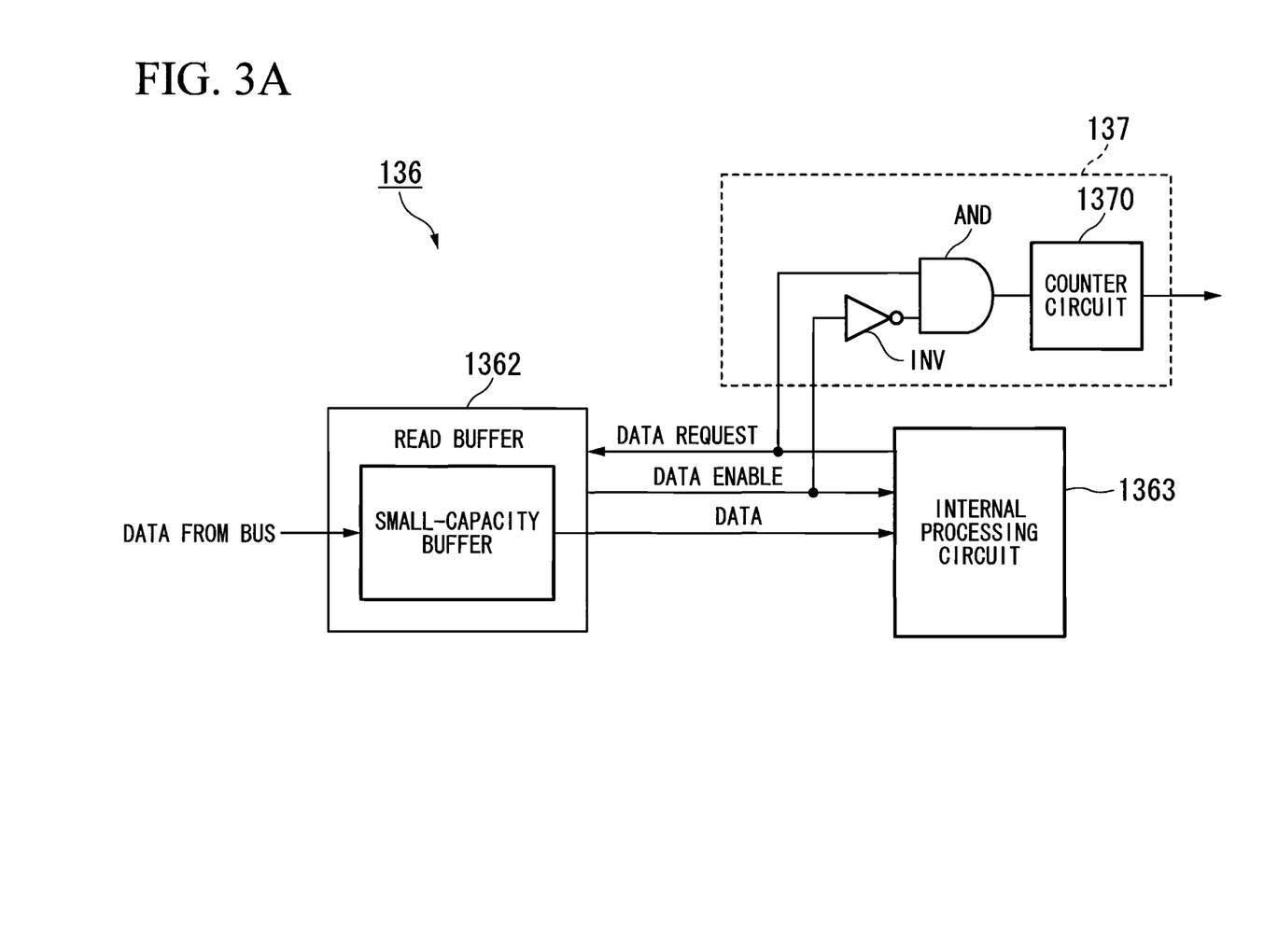
FIG. 3A, FIG. 3B, FIG. 4, and FIG. 4B are diagrams showing a schematic configuration and for explaining a method of obtaining priority guideline information in a processing block in accordance with the first preferred embodiment of the present invention.
Figure 3B:
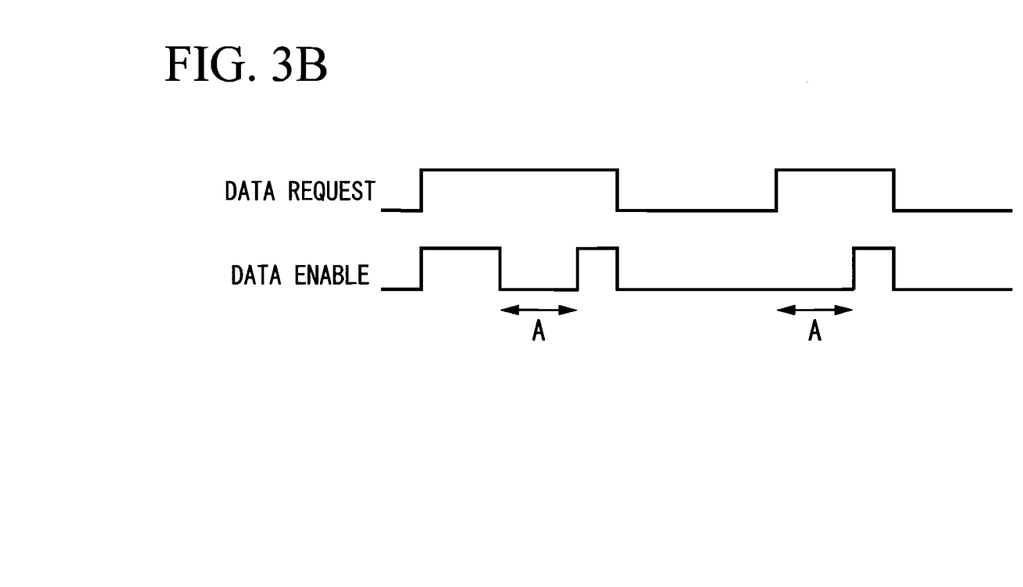
Figure 4A:
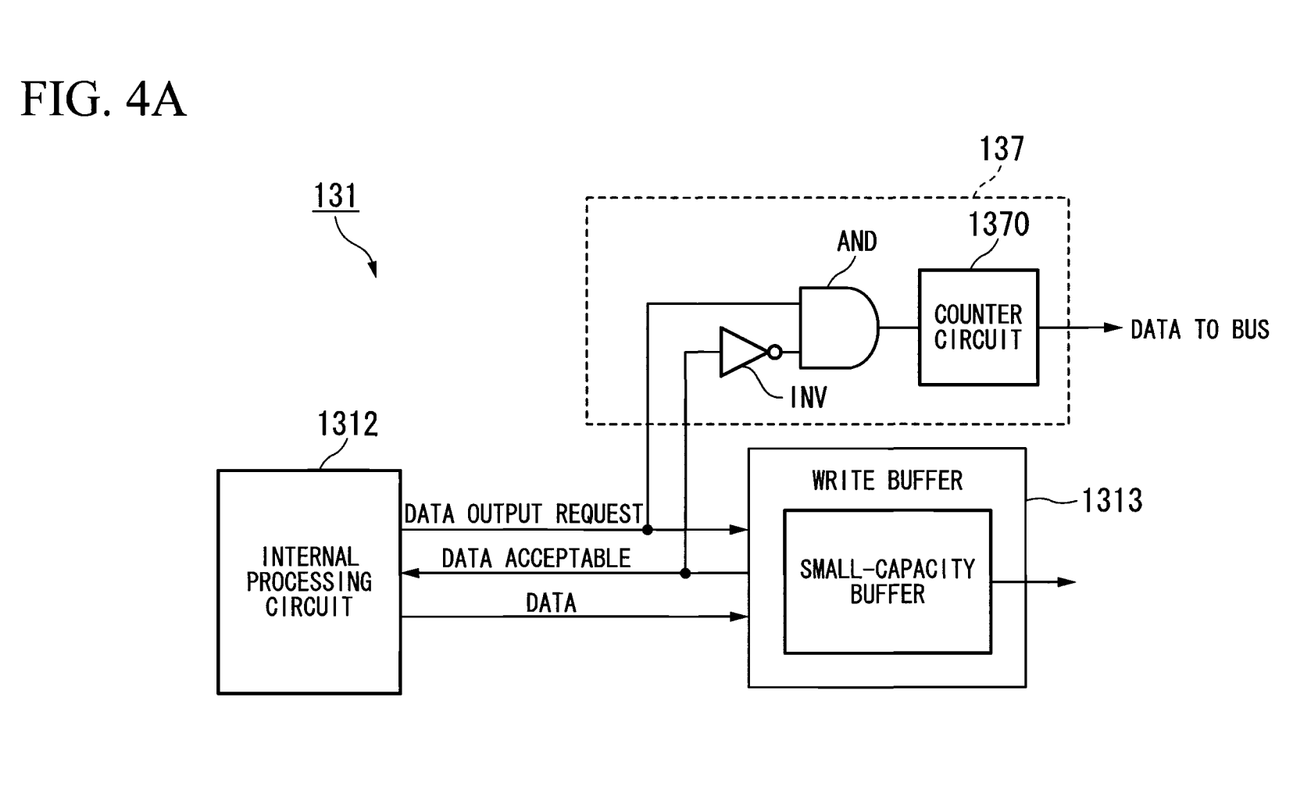
Figure 4B:
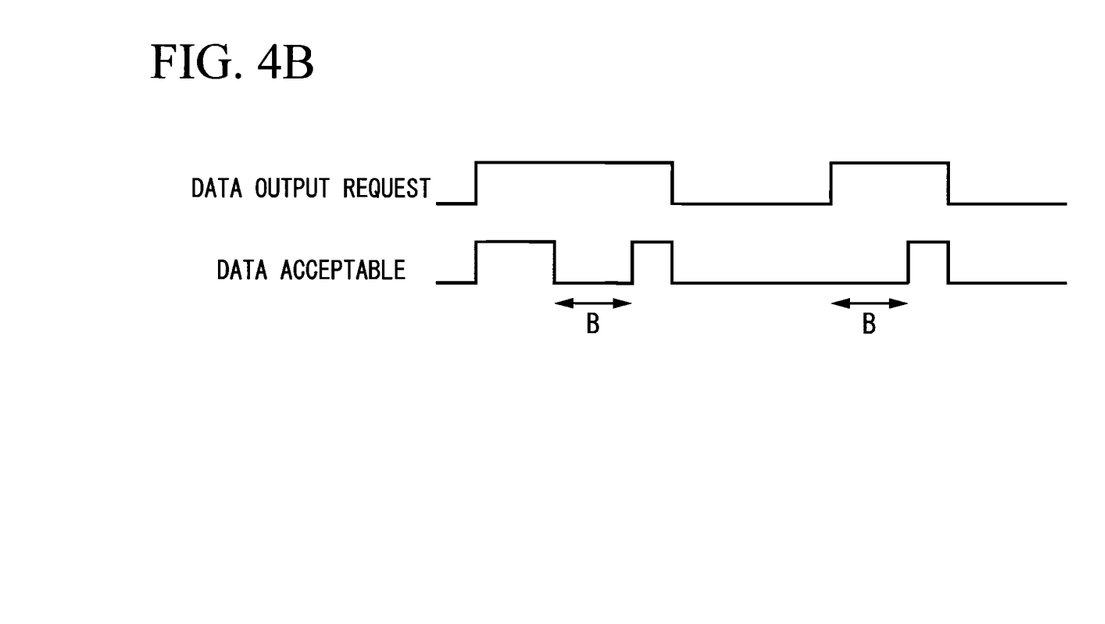

Next, a configuration in which priority guideline information on each processing block in the system control unit 10 is obtained will be described. FIG. 3A, FIG. 3B, FIG. 4A, and FIG. 4B are diagrams showing a schematic configuration and for explaining a method of obtaining priority guideline information in a processing block in accordance with the first preferred embodiment of the present invention. FIG. 3A and FIG. 3B show the case of the read proxy 136. FIG. 4A and the FIG. 4B show the case of the write proxy 131.

Firstly, the read proxy 136 shown in FIG. 3A and FIG. 3B will be described. FIG. 3A is a block diagram showing a configuration of constituent elements involved in obtaining priority guideline information in the read proxy 136. FIG. 3B is a diagram for explaining a method of obtaining priority guideline information. Note that FIG. 3A shows the case here an amount of data temporarily storable in the processing block is small. Namely, FIG. 3A shows a block diagram for obtaining priority guideline information in the read proxy 136 in which the read buffer 1362 is a small-capacity buffer.

The read proxy 136 processes the data obtained from the DRAM 20 by the internal processing circuit 1363. However, in the system control unit 10, each processing block is connected to the data bus 11, and hence, the processing blocks share the data bus 11. Therefore, even if data is to be obtained from the DRAM 20 through the DMA access, there are cases where it is not possible to obtain data necessary for processing depending on the timing that the read proxy 136 requests data. To address this, the read buffer 1362 is included in the read proxy 136. After the data that has been read from the DRAM 20 is stored in the read buffer 1362, the internal processing circuit 1363 starts processing. Therefore, in the read proxy 136, the period of time from when the internal processing circuit 1363 requests data to when data necessary for processing is stored in the read buffer 1362 through the DMA access, namely the latency of the data necessary for processing the internal processing circuit 1363 is an obstacle (bottleneck) to the processing of the read proxy 136. The bus bandwidth monitoring circuit 137 measures the latency of the internal processing circuit 1363 in the read proxy 136.

As shown in FIG. 3A, the bus bandwidth monitoring circuit 137 includes: a counter circuit 1370; and a logic circuit (a logical multiplication gate AND and a logical negation gate INV). Based on interface signals (a data request signal and a data enable signal) between the read buffer 1362 and the internal processing circuit 1363, the bus bandwidth monitoring circuit 137 measures (counts) the latency (clock cycles) of the internal processing circuit 1363 in the read proxy 136.

The data request signal shown in FIG. 3A is a signal that is turned to "High" level when the internal processing circuit 1363 requests data in the DRAM 20. The data enable signal is a signal that is turned to "High" level while the data from the DRAM 20 in accordance with the data request signal is temporarily stored in the read buffer 1362.

The bus bandwidth monitoring circuit 137 counts the time during which data is requested by the internal processing circuit 1363 but the data in accordance with the data request signal is not stored in the read buffer 1362. To be more specific, as shown in FIG. 3B, the bus bandwidth monitoring circuit 137 counts the number of clock cycles during a period A in which the data request signal is at "High" level and the data enable signal is at "Low" level. Then, the bus bandwidth monitoring circuit 137 outputs the counted number of clock cycles during the period A as priority guideline information.

Next, the write proxy 131 shown in FIG. 4A and FIG. 4B will be described. FIG. 4A shows a block diagram of constituent elements involved in obtaining priority guideline information in the write proxy 131. FIG. 4B shows a diagram for explaining a method of obtaining priority guideline information. Note that FIG. 4A shows the case where an amount of data temporarily storable in the processing block is small. Namely, FIG. 4A shows a block diagram for obtaining priority guideline information in the write proxy 131 in which the write buffer 1313 is a small-capacity buffer.

The write proxy 131 writes the data processed by the internal processing circuit 1312 to the DRAM 20. However, in the system control unit 10, the processing blocks are connected to the data bus 11, and hence, share the data bus 11. Therefore, even if data stored in the DRAM 20 is to be output through the DMA access, there are cases where it is not possible to output the data depending on the timing that the write proxy 131 finishes the processing of the data stored in the DRAM 20. To address this, the write buffer 1313 is included in the write proxy 131. With the data to be output to the DRAM 20 being stored in the write buffer 1313, the internal processing circuit 1312 is ready to start the following processing. The write proxy 131 outputs the data stored in the write buffer 131 to the DRAM 20 through the DMA access. However, in the write proxy 131, even if the internal processing circuit 1312 has completed the following processing, the latency to the time when the output of the data stored in the write buffer 1313 to the DRAM 20 through the DMA access, namely, the latency to the time when the write buffer 1313 finishes outputting the data process by the internal processing circuit 1312 in the previous processing is a bottleneck in the processing by the write proxy 131. The bus bandwidth monitoring circuit 137 measures the latency of the internal processing circuit 1312 in the write proxy 131.

As shown in FIG. 4A, the bus bandwidth monitoring circuit 137 has a configuration similar to that of the bus bandwidth monitoring circuit 137 shown in FIG. 3A. Namely, the bus bandwidth monitoring circuit 137 includes: a counter circuit 1370; and a logic circuit (a logical multiplication gale AND and a logical negation gate INV). Based on interface signals (a data output request signal and a data acceptable signal) between the internal processing circuit 1312 and the write buffer 1313, the bus bandwidth monitoring circuit 137 measures (counts) the latency (the number of clock cycles) of the internal processing circuit 1312 in the write proxy 131.

The data output request signal shown in FIG. 4A is a signal that is turned to "High" level when requesting a data output to the DRAM 20 after completion of the processing by the internal processing circuit 1312. The data acceptable signal is a signal that is turned to "High" level while the output data to the DRAM 20 in accordance with the data output request signal can be temporarily stored in the write buffer 1313.

The bus bandwidth monitoring circuit 137 counts the period of time when it is not possible to store data in accordance with the data output request signal in the write buffer 1313 although an output of data is requested by the internal processing circuit 1312, namely the period of time when there is a shortage in storage capacity of the write buffer 1313. To be more specific, as shown in FIG. 4B, the bus bandwidth monitoring circuit 137 counts the number of clock cycles in a period B in which the data output request signal is at "High" level and the data acceptable signal is at "Low" level. The bus bandwidth monitoring circuit 137 then outputs the counted number of clock cycles of the period B as priority guideline information.

Figure 5:
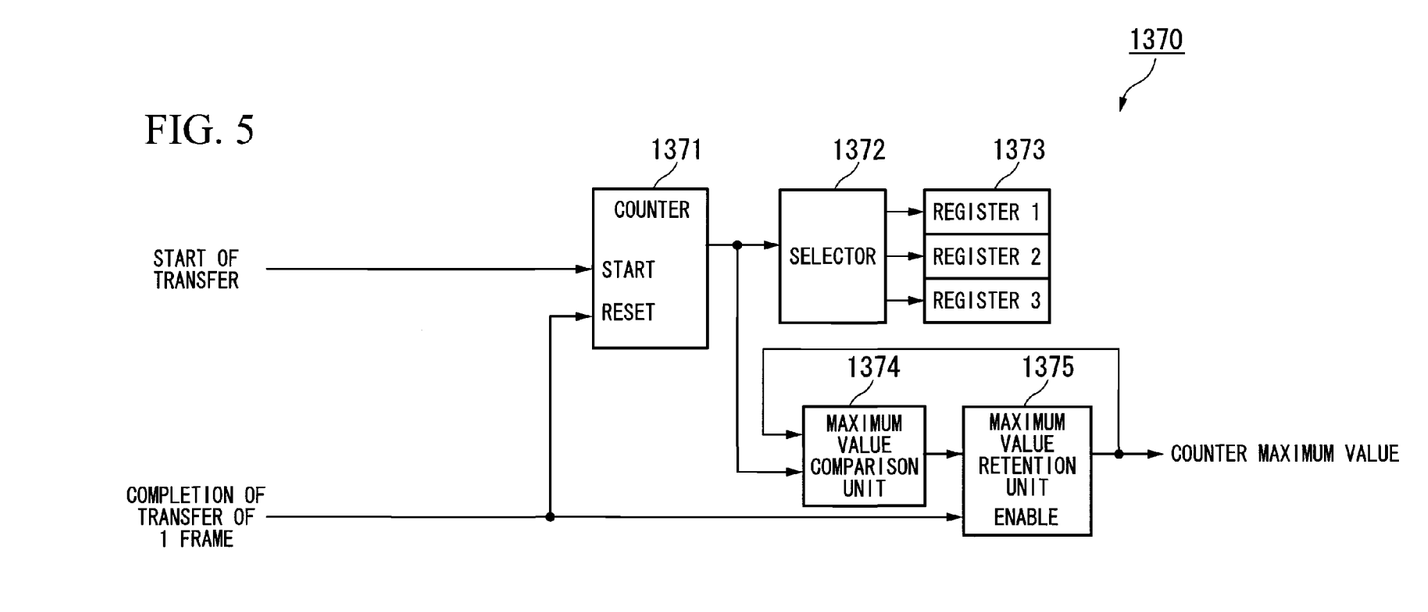
FIG. 5 is a block diagram showing a configuration of the bus bandwidth monitoring circuit 137 in the processing blocks in accordance with the first preferred embodiment of the present invention.

Next, the bus bandwidth monitoring circuit 137 will be described in further detail. FIG. 5 is a block diagram showing a configuration of the bus bandwidth monitoring circuit 137 in the processing blocks in accordance with the first preferred embodiment of the present invention. FIG. 5 is a block diagram showing a detailed configuration of the counter circuit 1370 shown in FIG. 3A and FIG. 4A. The counter circuit 1370 shown in FIG. 5 includes: a counter 1371; a selector 1372; a register 1373; a maximum value comparison unit 1374; and a maximum value retention unit 1375. The following description is for the exemplary case where transfer start signals are input in units of one frame to the read proxy 136 as the video interface 136 and the output image data obtained from the DRAM 20 in units of one frame are output to the display unit 40.

When a transfer start signal is input, the counter 1371 starts counting the latency (the number of clock cycles) of the internal processing circuit 1363. By a one-frame transfer completion signal that is input on completion of the transfer of one frame, the counter 1371 has its counting value (count value) initialized (reset).

The register 3373 is a register that temporarily stores the count value counted by the counter 1371. The count value stored in the register 1373 is used as a piece of information included in the priority guideline information to be obtained by the bus bandwidth monitoring circuit 137. In the bus bandwidth monitoring circuit 137 shown in FIG. 5, the configuration is for the case where the register 1373 stores count values for the past three frames.

The selector 1372 sequentially switches to the thanes in the register 1373 which are to be counted by the counter 1371. If the read proxy 136 is to output more than three frames of output image data to the display unit 40, the selector 1372 updates a count value already in the register to a new count value. For example, if the read proxy 136 is to output the output image data in four frames to the display unit 40, a count value for a first frame is stored in a register 1, a count value for a second frame is stored in a register 2, and a count value for a third frame is stored in a register 3. Then, a count value for a fourth frame is stored (updated) in the register 1.

The maximum value comparison unit 1374 compares the count value currently counted by the counter 1371 and the count value retained in the maximum value retention unit 1375, and outputs the greater of the two values to the maximum value retention unit 1375.

The maximum value retention unit 1375 retains, as a counter maximum value, the count value that is input from the maximum value comparison unit 1374 at the timing when a one-frame transfer completion signal is input, namely, at the timing when a transfer of one frame is completed. The counter maximum value retained by the maximum value retention unit 1375 is used as a piece of information included in the priority guideline information to be obtained by the bus bandwidth monitoring circuit 137.

As described above in the configuration shown in FIG. 5, in the frame-by-frame processing by the road proxy 136, the period of time when the DMA access is not completed at the timing when the data of the DRAM 20 is requested by the internal processing circuit 1363, namely, the latency of the internal processing circuit 1363 produced by the DMA access for a plurality of frames the past three frames in FIG. 5) can be obtained as pieces of priority guideline information by the bus bandwidth monitoring circuit 137 included in a processing block. At the same time, the counter maximum value can be obtained as a piece of priority guideline information. Based on the obtained pieces of priority guideline information, it is possible to set priority levels for the processing block.

The configuration of the bus bandwidth monitoring circuit 137 included in the processing block is not limited to that shown in FIG. 5. For example, the configuration may include, in addition to the constituent elements shown in FIG. 5, a counter that counts the latency of the internal processing circuit 1363 for all the frames, that is a counter that is reset only when operation mode of the image processing device is changed without the count value being reset according to the input of the one-frame transfer completion signal, and the counter may obtain priority guideline information when the read proxy 136 is in operation in the same operational mode.

Next, a method of setting the priority levels of each processing block in the system control unit 10 based on the priority guideline information will be described. In the image processing device 1, the priority levels of each processing block is set according to the importance level for operation of each processing block in each operation mode of the image processing device 1. In the following description, it is supposed that the bus controller 12 in the system control unit 10 sets priority levels in the system control unit 10 based on the priority guideline information which is output from each processing block, and arbitrates the DMA access requests from the processing blocks.

The importance levels for operation of each processing block in each operation mode of the image processing device 1 are, for example, divided as follows, and the priority levels are set according to the importance level of their operation based on the following concept. In the following description, it is supposed that the priority guideline information is made of count value(s) in a predetermined processing unit (in the example shown in FIG. 5, made only of a single count value stored in the register 1 in the register 1373).

(Importance Level 1)

For example, the image-pickup interface 131 and the video interface 136 are two types of processing blocks with highest priority level in the image processing device 1. Therefore, their priority levels are required to be set high. At this time, the bus controller 12 sets the priority levels so that the count values in the pieces of priority guideline information which are output from the image-pickup interface 131 and the video interface 136 are "0." If there is a plurality of processing blocks of the same type whose priority levels are to be set to the count value of "0," the setting is made so that the count value is "0" and that the level of priority is low. This is to prevent the DMA accesses by the processing blocks with the highest importance level from occupying the data bus 11.

(Importance Level 2)

A processing block in the image processing device 1 which does not have the highest priority level but whose processing time to the completion of processing (permissible processing time) is predetermined is required to complete the processing within the permissible processing time. At this time, the bus controller 12 calculates the time during which the processing by the processing block was at halt (halt time) based on the count value of the priority guideline information, and sets the priority level so that the processing by the processing block will be completed within the predetermined permissible processing time. For example, the bus controller 12 multiplies the count value by the operation clock speed of the processing block to find the halt time of the processing block. The bus controller 12 then compares the margin time with the obtained halt time, where the margin time is obtained by subtracting the fastest time (the time in the case where the processing by the processing block has been completed without a halt) from the permissible processing time. If the obtained halt time is not shorter than the margin time as a result of the comparison between the obtained halt time and the margin time, the priority level of the processing block is set high, if the obtained halt time is not longer than the margin time, the level of priority of the processing block is set low. The priority level of a processing block is set so that the time in which predetermined margin is included in the halt time of the relevant processing block is equal to the margin time. This makes it possible to prevent the priority level of the processing block from being set higher than necessary.

(Importance Level 3)

For a processing block in the image processing device 1 whose importance level is low and whose permissible processing time is not determined, the initially-set priority level is not particularly changed. However, if the priority level turns out to be higher than that of the processing block with importance level 1 or importance level 2, for example the priority level may be set lower than that of the processing block with importance level 1 or importance level 2.

As described above, the priority level of each processing block in the system control unit 10 is set based on a piece of priority guideline information obtained by the bus bandwidth monitoring circuit 137 that is included in the processing block. Thereby, the priority levels of the processing blocks can be set so that a failure as a system will not be caused in each operation mode of the image processing device 1. Note that the priority level of each processing block in the system control unit 10 may be set based on plural pieces of priority guideline information obtained by the bus bandwidth monitoring circuits 137 that are included in the processing block.

In the description of the method of setting the priority levels of the processing blocks, the bus controller 12 in the system control unit 10 sets the priority levels and arbitrates the DMA access requests. However, the method is not limited to this. For example, a control unit (not shown in the figure) in the system control unit 10 or a control unit (not shown in the figure) for the whole of the image processing device 1 may set the priority levels of the processing blocks in the system control unit 10, and the bus controller 12 in the system control unit 10 may arbitrate the DMA access requests based on the priority levels that have been set.

Figure 6:
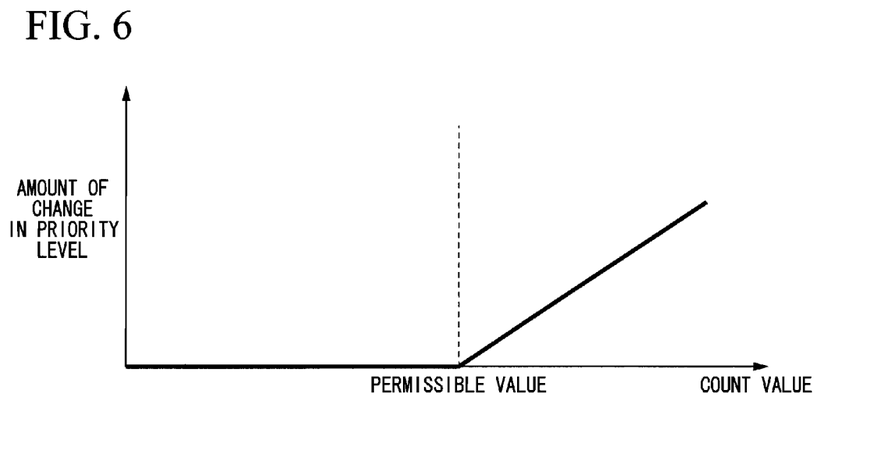
FIG. 6 is a diagram for explaining an example of modifying the amount of change by which the priority level of a processing block is changed according to the result (priority guideline information) obtained by the bus bandwidth monitoring circuit in accordance with the first preferred embodiment of the present invention.

If the priority level in each processing block in the system control unit 10 is dynamically changed, for example the amount by which the priority level is changed can be modified based on the priority guideline information. FIG. 6 is a diagram for explaining an example of modifying the amount of change by which the priority level of a processing block is changed according to the result (priority guideline information) obtained by the bus bandwidth monitoring circuit in accordance with the first preferred embodiment of the present invention.

In the example shown in FIG. 6, if the count value as the priority guideline information is not greater than the predetermined permissible value, the priority level of the relevant processing block is not changed. If the count value is greater than the predetermined permissible value, the amount of change for the priority level is made larger. With such control, for example if the latency of the internal processing circuit in a specified processing block is longer than the permissible value, the amount of change for setting the priority level high can be modified according to the latency of the internal processing circuit. As a result, even in a processing block in which the probability of acceptance of DMA access requests by the bus controller 12 is low, it is possible to increase the probability of acceptance of the DMA access requests.

As described above, according to the preferred embodiment of the present invention, a bus bandwidth monitoring circuit is included in each processing block. Thereby, the internal processing circuit in each processing block can obtain the period of time for which the internal processing circuit is kept waiting as priority guideline information through the DMA access. Based on the pieces of priority guideline information obtained by the processing blocks, the priority levels of the processing blocks can be efficiently set. As a result, it is possible to find the settings of the levels of priority that do not cause a failure as a system at an early stage, improving the efficiency in system development.

In the preferred embodiment of the present invention, the description has been for the case of a configuration in which, as the priority guideline information obtained by the bus bandwidth monitoring circuit 137, the count value and the counter maximum value (the maximum value of the count value) are obtained as shown in FIG. 5. However, as priority guideline information, other information may be obtained. For example, by obtaining the minimum value of the count value, it is also possible to estimate the maximum operation speed of the processing blocks in the current settings of the priority levels. Furthermore, for example, the number of times that the count value not less than a predetermined value and the number of times that the count value not greater than the predetermined value may be obtained. The results can be utilized as information useful for system development such as whether the change in the settings of the priority levels has made the processing time of the processing block shorter or longer.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the invention is not to be considered as being limited by the foregoing description, and is only limited by the scope of the claims.

What is claimed is:

1. A bus bandwidth monitoring device comprising:
a read buffer unit that is connected to a common bus, the read buffer unit storing data that has been input through the common bus;
a processing unit that performs predetermined processing based on the data stored in the read buffer unit; and
a detection unit that detects a bandwidth of the data transmitted through the common bus based on a state of data transaction between the read buffer unit and the processing unit,
wherein the detection unit comprises: a counter unit that measures a period of time during which although an output of the data stored in the read buffer unit is requested by the processing unit, the read buffer unit is in a state incapable of outputting the data in accordance with the output request of the data, and
wherein information on the period of time measured by the counter unit is output as information on the bandwidth of the data on the common bus.

2. A bus bandwidth monitoring device comprising:
a processing unit that performs predetermined processing on input data and outputs the processed data;
a write buffer unit that is connected to a common bus, the write buffer unit storing the data that has been output by the processing unit and outputting the stored data to the common bus; and
a detection unit that detects a bandwidth of the data transmitted through the common bus based on a state of data transaction between the processing unit and the write buffer unit,
wherein the detection unit comprises: a counter unit that measures a period of time during which although a request to store the data processed by the processing unit in the write buffer unit is made, the write buffer unit is in a state incapable of storing the data in accordance with the request to store the data, and
wherein information on the period of time measured by the counter unit is output as information on the bandwidth of the data on the common bus.

3. The bus bandwidth monitoring device according to claim 2,
wherein the detection unit comprises: a retention unit that stores plural pieces of information on the periods of time measured by the counter unit, and
wherein plural pieces of information on the period of time measured by the counter unit for a plurality of times are output as pieces of information on the bandwidth of the data on the common bus.

4. The bus bandwidth monitoring device according to claim 2, wherein
the detection unit outputs information on a maximum period of time out of the periods of time measured by the counter unit as information on bandwidth of the data on the common bus.

5. The bus bandwidth monitoring device according to claim 1,
wherein the detection unit comprises: a retention unit that stores plural pieces of information on the periods of time measured by the counter unit, and
wherein plural pieces of information on the period of time measured by the counter unit for a plurality of times are output as pieces of information on the bandwidth of the data on the common bus.

6. The bus bandwidth monitoring device according to claim 1, wherein
the detection unit outputs information on a maximum period of time out of the periods of time measured by the counter unit as information on bandwidth of the data on the common bus.

7. A bus bandwidth monitoring method comprising steps of:
storing data that is input via a common bus;
performing predetermined processing based on the stored data; and
detecting a bandwidth of data transmitted through the common bus based on a state of data transaction on the common bus,
wherein the detection step comprises: measuring a period of time during which although an output of the data stored in the read buffer unit is requested by the processing unit, the read buffer unit is in a state incapable of outputting the data in accordance with the output request of the data, and
wherein information on the period of time measured is output as information on the bandwidth of the data on the common bus.

8. A bus bandwidth monitoring method comprising steps of:
performing predetermined processing on input data and outputting the processed data;
receiving and storing the output data via a common bus;
outputting the stored data to the common bus; and
detecting a bandwidth of data transmitted through the common bus based on a state of data transaction on the common bus,
wherein the detecting step comprises: measuring a period of time during which although a request to store the data processed by the processing unit in the write buffer unit is made, the write buffer unit is in a state incapable of storing the data in accordance with the request to store the data, and wherein information on the period of time measured is output as information on the bandwidth of the data on the common bus.

* * * * *